United States Patent [19]

Kosa

[11] 4,442,234
[45] Apr. 10, 1984

[54] NYLON FOAM

[75] Inventor: Bruce G. Kosa, Woodstock, Conn.

[73] Assignee: Rogers Corporation, Rogers, Conn.

[21] Appl. No.: 516,779

[22] Filed: Jul. 25, 1983

[51] Int. Cl.³ .............................................. C08J 9/30
[52] U.S. Cl. ................................... 521/112; 521/134; 521/183; 521/189; 525/420
[58] Field of Search ................ 525/420; 521/189, 112, 521/183, 134

[56] References Cited

U.S. PATENT DOCUMENTS

| | | | |
|---|---|---|---|
| 3,060,135 | 10/1962 | Becke et al. | 521/183 |
| 3,600,336 | 8/1971 | Okada et al. | 521/183 |
| 4,022,719 | 5/1977 | Okuyama et al. | 521/183 |
| 4,026,834 | 5/1977 | Cordes et al. | 521/183 |
| 4,028,287 | 6/1977 | Sato et al. | 521/183 |

Primary Examiner—Morton Foelak
Attorney, Agent, or Firm—David S. Fishman

[57] ABSTRACT

A nylon foam product produced by frothing in an intensive mixer a reaction mixture of catalyst, caprolactam and polyol prepolymer in the presence of a surfactant and gaseous frothing agent.

4 Claims, 1 Drawing Figure

NYLON FOAM

BACKGROUND OF THE INVENTION

This invention relates to nylon foams and a method of producing same, in particular, it relates to a foam produced by means of the mechanical frothing of a nylon block copolymer material.

Nylon 6 block copolymers (NBC) are a class of polymers based on the anionic polymerization of caprolactam with polymeric polyols. In general, the system utilizes di-functional imides which act as coupling agents between polyol and nylon blocks, as well as functioning as activated sites for caprolactam polymerization.

In the procedure of Nylon 6 block copolymers, two reactant streams are brought together, mixed and finally injected under pressure into a mold wherein polymerization and development of resin properties are essentially achieved. The first of the two reactant streams comprise a catalyst dissolved in molten caprolactam, and the second comprises a prepolymer of a polyol reacted with a bisimide in molten caprolactam.

The NBC system so produced may be modified in a number of ways and find excessive use in reaction injection molding operation, in that such a system yields products generally characterized by a good impact strength/stiffness balance and a relatively flat modular temperature response.

SUMMARY OF THE INVENTION

This invention comprises a nylon block copolymer foam having a density of from about 10 lbs/ft$^3$ to about 60 lbs/ft$^3$ wherein said foam product is produced by frothing the resultant mixture of two modified caprolactam streams in the presence of a surfactant and a frothing agent. Specifically, the process for producing said foam is as follows:

(a) A stream of molten caprolactam that is catalyzed with caprolactam magnesium bromide is intensively mixed with a molten caprolactam stream that is modified with a prepolymer of a polyol and a bisimide;

(b) While mixing said streams, in an intensive mixer, a silicone surfactant and a frothing agent are combined therewith;

(c) The reactant mixture is injected into heated molds where it is allowed to cure; and, (d) The resultant product that is removed from the molds is a tough rigid structural foam having a uniform cell size and a density of from 10 to 60 lbs/ft$^3$.

DETAILED DESCRIPTION OF THE INVENTION

Figure 1:
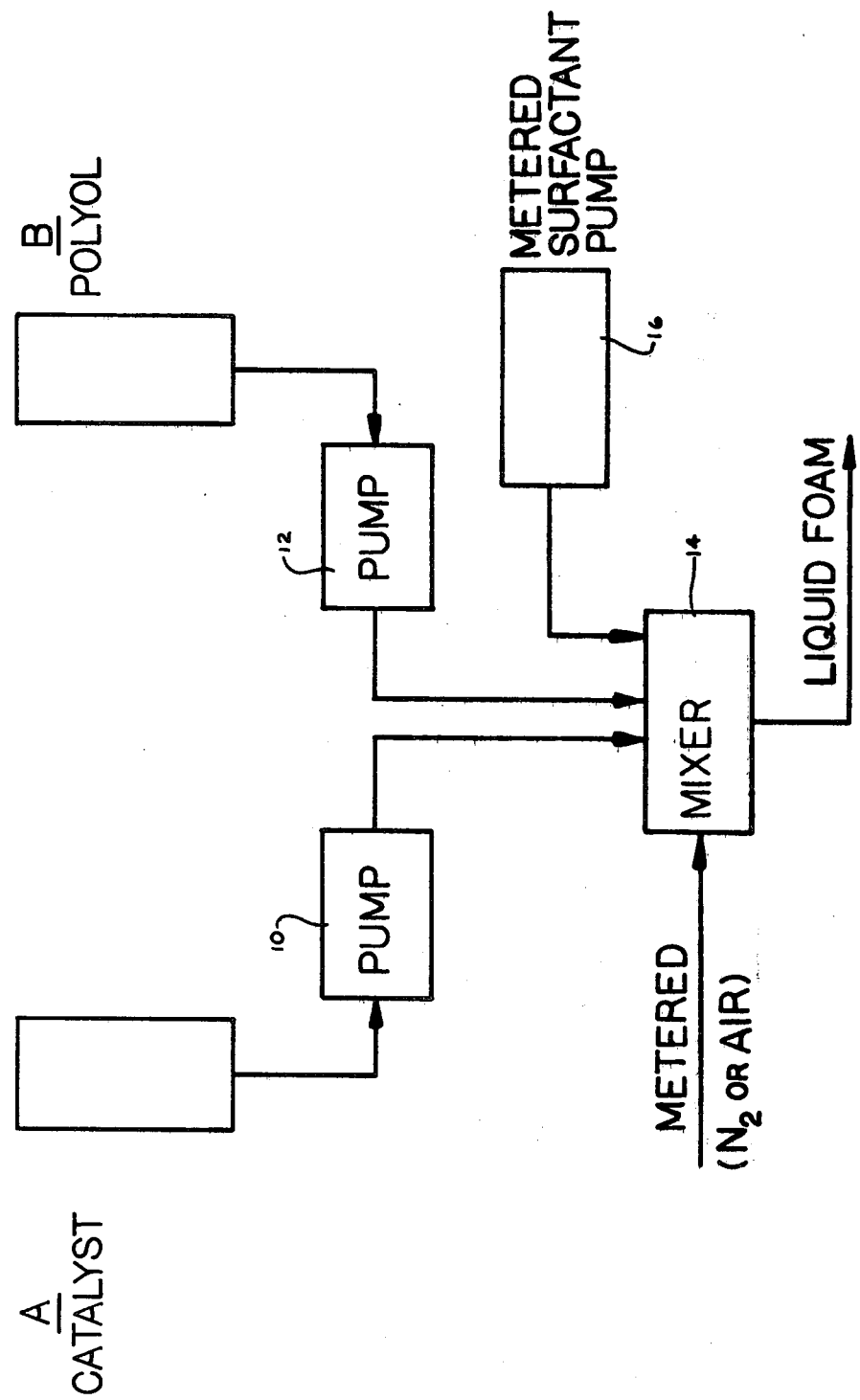
FIG. 1 is a block diagram generally identifying the method of producing the NBC foam of the present invention.

As seen in FIG. 1 of the drawings, the first part of the process involves the preparation of two reactant streams which are ultimately mixed in an intensive mixture.

The first of such reactant streams is noted as A-Catalyst and represents a catalyzed caprolactam. Typically, a bromide catalyst is added to molten caprolactam in which it reacts and dissolves. Said catalysts comprise from about 5% to 25% by weight of the reaction mixture.

The second reactant stream designated in the drawing as B-Polyol basically comprises a polyol and a bisimide coupler-activator also dissolved in molten caprolactam in stoichiometric portions so as to ensure polymerization. In the uncatalyzed state, i.e., before mixed with reactant stream A, reactant stream B is a stable mixture for an indefinite period of time. Typically, a polyol such as polypropylene glycol is combined with bis acyllactam to form the prepolymer and from about 10% to 90% by weight of said prepolymer is combined with the molten caprolactam. The acyllactam end groups act as an initiator for the caprolactam polymerization which results in a block copolymer comprised of polyether soft segments and nylon 6 hard segments.

While maintaining each reactant stream at about 70° C. to 90° so as to prevent degradation, the two reactant streams are pumped to an intensive mixer where they are combined with from 2% to about 10% of a surfactant in the presence of an inert gas, such as nitrogen. Such surfactant is preferably a silicone based product; however, any surfactant which is compatible with the system may be used. It has been found that varying the flow rate of the gas to the intensive mixer during frothing allows control of the density of the foam product of from about 10 lbs/ft$^3$ to about 60 lbs/ft$^3$.

Once the two reactant streams have been mixed for a sufficient period of time and the surfactant and frothing agent have been added thereto, the resultant liquid is injected into a preheated mold where it is allowed to cure into a solid nylon foam product of a uniform cell size.

The following examples are provided to further illustrate the scope of the present invention; however, they should not be considered to be limiting thereof.

In the following example, a catalyzed reactant stream, Stream A, comprises 1,000 grams to caprolactam and 250 grams Nyrim catalyst (a caprolactam magnesium bromide catalyst manufactured by Monsanto Company) and polyol stream, Stream B, comprises 600 grams caprolactam and 400 grams Nyrim Prepolymer (a prepolymer of bis acyllactam reactant with a hydroxyl terminated polypropylene oxide polymer sold by Monsanto Company). In each case, the surfactant employed was Niax 5614 (a block copolymer of polydimethysiloxane and polyoxyalkylene available from Union Carbide Corporation), a silicone-based surfactant, and the frothing agent was nitrogen gas introduced to the mixture via a Rotameter so as to give selected froth densities.

| Conditions | EXAMPLES | | | | |
| --- | --- | --- | --- | --- | --- |
|  | 1 | 2 | 3 | 4 | 5 |
| Stream A Temperature (°F.) | 190 | 195 | 180 | 170 | 170 |
| Stream B Temperature (°F.) | 190 | 200 | 205 | 165 | 165 |
| Stream A Flow (g/min) | 91.1 | 70 | 71 | 33.5 | 53 |
| Stream B Flow (g/min) | 91.1 | 70 | 81 | 33.5 | 53 |
| Surfactant Flow (g/min) | 10 | 9 | 0 | 9 | 9 |
| Mixing Speed (RPM) | 600 | 600 | 1100+ | 1100 | 1100 |
| Froth Density (lb/ft$^3$) | 25 | 55 | — | 43 | 53 |
| Mold Temperature (°F) | 275 | 275 | 275 | 280 | 270 |
| Cure Time (Min) | 5 | 5 | 5 | 5 | 5 |
| Foam Density (lb/ft$^3$) | 20 | 52.2 | — | 40 | 54 |

As will be noted from the above examples, the density of the final foam product is controlled by the amount of inert gas injected (as measured by froth density). All final molded foam products were tough and rigid with uniform cell size.

It will be clear to those skilled in the art that the same techniques as disclosed herein could be used to make liquid cast nylon foam which contains no soft segment blocks. Also, soft segment blocks other than polyether, such as polybutadiene, could be employed to make the prepolymer.

Having thus described this invention, what is claimed is:

1. A process for preparing a nylon block copolymer foam comprising:
   (a) mixing a catalyzed reactant stream comprising a bromide catalyst dissolved in molten caprolactam with a second molten caprolactam stream containing a polyol prepolymer prepared by reacting a polyol with bis acyllactam in an intensive mixer;
   (b) adding a silicone-based surfactant and a frothing agent to said mixture so as to froth the mixture;
   (c) injecting said frothed mixture into a preheated mold, and
   (d) curing said frothed mixture in said mold to form said foam.

2. The process of claim 1 wherein said surfactant comprises between 2% and 10% by volume of said mixture in said mixer.

3. The process of claim 1 wherein said frothing agent is an inert gas.

4. The process of claim 1 wherein said foam has a density of from about 10 lbs/ft$^3$ to about 60 lbs/ft$^3$ in its cured state.

* * * * *

UNITED STATES PATENT OFFICE
CERTIFICATE OF CORRECTION

PATENT NO. : 4,442,234
DATED : Apr. 10, 1984
INVENTOR(S) : Bruce G. Kosa

It is certified that error appears in the above-identified patent and that said Letters Patent are hereby corrected as shown below:

Column 1, line 26, "excessive" should be --extensive--.

Signed and Sealed this

Thirtieth Day of April 1985

[SEAL]

Attest:

DONALD J. QUIGG

*Attesting Officer*   *Acting Commissioner of Patents and Trademarks*